United States Patent
Zhang et al.

(10) Patent No.: US 11,493,273 B2
(45) Date of Patent: Nov. 8, 2022

(54) DEVICE AND METHOD FOR MEASURING SOFTENING AND MELTING PERFORMANCES OF IRON ORE IN BLAST FURNACE UNDER REDUCING CONDITION

(71) Applicant: Chongqing University, Chongqing (CN)

(72) Inventors: Shengfu Zhang, Chongqing (CN); Chenguang Bai, Chongqing (CN); Rongjin Zhu, Chongqing (CN); Cheng Yin, Chongqing (CN); Qingyu Deng, Chongqing (CN); Liangying Wen, Chongqing (CN); Jian Xu, Chongqing (CN); Jie Dang, Chongqing (CN); Zhixiong You, Chongqing (CN); Wenzhou Yu, Chongqing (CN); Liwen Hu, Chongqing (CN)

(73) Assignee: Chongqing University

( * ) Notice: Subject to any disclaimer, the term of this patent is extended or adjusted under 35 U.S.C. 154(b) by 94 days.

(21) Appl. No.: 16/925,972

(22) Filed: Jul. 10, 2020

(65) Prior Publication Data
US 2021/0010753 A1 Jan. 14, 2021

(30) Foreign Application Priority Data
Jul. 12, 2019 (CN) .......................... 201910631697.5

(51) Int. Cl.
*F27B 1/28* (2006.01)
*C21B 5/00* (2006.01)
*F27D 19/00* (2006.01)

(52) U.S. Cl.
CPC ................ *F27B 1/28* (2013.01); *C21B 5/001* (2013.01); *C21B 2005/005* (2013.01); *F27D 2019/0031* (2013.01)

(58) Field of Classification Search
CPC ..... F27B 1/28; C21B 5/001; C21B 2005/005; C21B 5/008; F27D 2019/0031; Y02P 10/122; G01N 25/02; G01N 33/24
USPC ........................................................ 75/375
See application file for complete search history.

(56) References Cited

FOREIGN PATENT DOCUMENTS

| CN | 109991125 A | * | 7/2019 |
| JP | 2016057149 A | * | 4/2016 |

OTHER PUBLICATIONS

CN-109991125-A Translation (Year: 2019).*
JP-2016057149-A Translation (Year: 2016).*

* cited by examiner

*Primary Examiner* — Brian D Walck
*Assistant Examiner* — Danielle Carda
(74) *Attorney, Agent, or Firm* — Lerner, David, Littenberg, Krumholz & Mentlik, LLP (57) ABSTRACT

A method for measuring the softening and melting performances of iron ore in blast furnace is disclosed, which is implemented by a device including a high temperature furnace, gas supply system, a loading system and a weighing system. The method includes: step 1: the dried coke and iron ore specimen are placed in the graphite crucible in a specified way; step 2: the graphite crucible is placed in the high temperature furnace, and $N_2$ is continuously fed into the high temperature furnace to reach an airtightness requirement; step 3: a vacuum pump is used to extract mixed gas in a hearth of the high temperature furnace and heating process is started; step 4: both the composition of mixed gas and pressure imposed on the iron ore are controlled according to the designed temperature variation; step 5: data are acquired to calculate.

3 Claims, 4 Drawing Sheets

DEVICE AND METHOD FOR MEASURING SOFTENING AND MELTING PERFORMANCES OF IRON ORE IN BLAST FURNACE UNDER REDUCING CONDITION

TECHNICAL FIELD

The present invention relates to the technical field of metallurgy, in particular to a device and method for measuring the softening and melting performances of iron ore in a blast furnace under a reducing condition.

BACKGROUND

Iron ores are important raw materials for iron and steel production, which are usually fed into the blast furnace in the form of sintered ores, pellets or lumps. In the blast furnace, when the low-temperature ores are descending, they are reduced as their oxygen atom is gradually captured by the gas from the outside to the inside. At the same time, the ores exchange heat with the high temperature gas to obtain heat. The ores are softened, melted and dropped during the heating process to achieve the separation of slag and iron. The softening and melting temperatures and the softening and melting intervals have a significant impact on the permeability and fuel consumption of the blast furnace.

The high temperature reduction of iron ores under load is designed to test the softening, melting and dropping properties of iron ores. The test simulates the smelting condition of the blast furnace to measure the expansion, softening interval, pressure difference of reducing gas, softening-melting interval, dropping temperature and other important parameters of iron ores. It is an important method for evaluating the smelting properties of sintered ores, pellets and lumps in the blast furnace.

However, the existing device and method for measuring the softening, melting and dropping properties of iron ores induced by high temperature reduction under load in the blast furnace have a series of problems. 1. The reducing gas consists only of CO and $N_2$, which is too simple to simulate the continuous changes in the actual atmosphere of the blast furnace. 2. The load applied to the iron ore is fixed, without considering the change in the pressure of the stock column to the iron ore in the blast furnace due to the varying position of the iron ore during actual smelting process. 3. The heating rate does not conform to the actual temperature change of the iron ore during the descending process in the blast furnace. 4. No weighing device is provided, so the online weighing of the iron ore is not achieved.

SUMMARY

In order to solve the above technical problems existing in the prior art, the present invention provides a device for measuring the softening and melting performances of iron ore. The present invention simulates the actual atmosphere in blast furnace, realizes continuous changes of the atmosphere, dynamically adjusts the load on the iron ore specimen, and realizes online weighing of the iron ore specimen.

To solve the above-mentioned technical problems, the present invention adopts the following technical solutions:

A device for measuring the softening and melting performances of iron ore in blast furnace under a reducing condition includes a high temperature furnace, a gas supply system, a loading system and a weighing system.

The high temperature furnace is provided therein with a hearth; the hearth is provided therein with a cylindrical graphite crucible (with an open upper end) and a temperature acquisition device for acquiring temperature data of the high temperature furnace;

The gas supply system is used to inject a reducing gas including $N_2$, $H_2$, $CO_2$ and CO into the hearth; the gas supply system includes a gas storage device and a gas mixing device communicating with the gas storage device through a pipe; the gas storage device is used to store the components of the reducing gas separately and control flow rates of the components of the reducing gas according to the temperature of the high temperature furnace acquired by the temperature acquisition device; the gas mixing device is used to fully mix the components of the reducing gas and communicate with the hearth of the high temperature furnace through a pipe.

The loading system includes a loading rod; a lower end of the loading rod extends into the graphite crucible, and an upper end of the loading rod extends out of the high temperature furnace; a portion of the upper end of the loading rod extending out of the high temperature furnace is fixedly connected with a loading device and a displacement sensor from bottom to top; the loading device drives the loading rod to move vertically according to the temperature of the high temperature furnace acquired by the temperature acquisition device; a lower end surface of the loading rod is provided with a loading head for applying a pressure to iron ore specimen in the graphite crucible; the loading head vertically moves in the graphite crucible to change the pressure applied to the iron ore specimen when the loading rod moves vertically.

The weighing system includes an electronic balance, a controller and a weight sensor; the electronic balance is placed in a sealed box at a lower part of the high temperature furnace to send a weight change to an external computer via the weight sensor; the controller is used to calibrate the electronic balance.

In this way, when the measuring device of the present invention is used to measure the softening and melting performances of the iron ore specimen, the iron ore specimen is placed in the graphite crucible, and the temperature acquisition device measures the temperature of the high temperature furnace in real time.

During the measurement process, on one hand, the gas supply system inputs the reducing gas including $N_2$, $H_2$, $CO_2$ and CO into the high temperature furnace. The flow rate of each component in the reducing gas is dynamically controlled by the gas storage device according to the temperature of the high temperature furnace acquired by the temperature acquisition device. The components of the reducing gas are fully mixed in the gas mixing device and input into the high temperature furnace. The content of the components in the reducing gas in the high temperature furnace changes dynamically with the temperature of the high temperature furnace. In this way, the present invention achieves dynamic control of the composition and flow rate of the reducing gas, making it closer to the actual working atmosphere of the blast furnace.

On the other hand, the loading device drives the loading rod to move vertically according to the temperature of the high temperature furnace acquired by the temperature acquisition device, and the loading rod drives the loading head to move vertically in the graphite crucible while moving vertically. Thus, the pressure applied by the loading head to the iron ore specimen changes dynamically with the temperature of the high temperature furnace, which is closer to the change in the pressure of the stock column to the iron ore in the high temperature furnace due to the varying position of the iron ore during actual smelting process. Meanwhile, the displacement sensor detects the displacement of the loading rod in real time, which more realistically simulates the influence of the pressure of the stock column in the blast furnace on the melting and dropping properties of the iron ore.

In addition, the weighing system achieves online weighing of the iron ore.

Beneficial effects: The present invention inputs a mixed reducing gas composed of $N_2$, $CO_2$, CO and $H_2$ into the high temperature furnace, and dynamically adjusts the composition and flow rate of the reducing gas according to the temperature of the high temperature furnace. Thus, the high temperature furnace of the measuring device is closer to the actual smelting environment. In addition, the present invention dynamically adjusts the pressure applied by the loading head on the iron ore specimen according to the temperature of the high temperature furnace, so as to better simulate the change in the pressure of the stock column to the iron ore in the high temperature furnace due to the varying position of the iron ore during actual smelting process. Therefore, the measuring device of the present invention better simulates the actual working atmosphere of the iron-making blast furnace and dynamically adjusts the load on the iron ore specimen, so that the test results are closer to the actual operation of the iron-making blast furnace.

Preferably, the gas storage device includes an $N_2$ supply device, a $H_2$ supply device, a $CO_2$ supply device and a CO supply device; the $N_2$ supply device includes a $N_2$ cylinder for storing $N_2$ and a $N_2$ flow control valve for controlling a flow rate of $N_2$; the $H_2$ supply device includes a $H_2$ cylinder for storing $H_2$ and a $H_2$ flow control valve for controlling a flow rate of $H_2$; the $CO_2$ supply device includes a $CO_2$ cylinder for storing $CO_2$ and a $CO_2$ flow control valve for controlling a flow rate of $CO_2$; the CO supply device includes a CO cylinder for storing CO and a CO flow control valve for controlling a flow rate of CO.

In this way, the components of the reducing gas are stored separately, and their flow rates are controlled by the respective flow control valve, which achieves better control of the flow rates of the components in the whole measurement process.

Preferably, the measuring device further includes a waste gas detection device; the waste gas detection device includes a gas analyzer; the gas analyzer communicates with a gas outlet through a pipe; the gas outlet is provided at an upper end of the high temperature furnace; the gas analyzer is used to measure the content of $N_2$, $H_2$, $CO_2$ and CO in the gas discharged from the gas outlet in real time, and calculate a direct reduction degree of the iron ore based on carbon-oxygen balance.

In this way, the gas analyzer measures the content of each component discharged from the gas outlet in real time, and easily calculates the direct reduction degree of the iron ore based on carbon-oxygen balance.

Preferably, an upper end surface and a lower end surface of the high temperature furnace are provided with openings communicating with the hearth; the opening of the upper end surface of the high temperature furnace is provided with a sealing cover in sealed connection with the upper end surface of the high temperature furnace; the opening of the lower end surface of the high temperature furnace is provided with a cylindrical sealed box open on an upper end and communicating with the hearth; the upper end opening of the sealed box has an area larger than that of the lower end opening of the high temperature furnace; the sealed box is provided with a reducing gas introduction hole on a side; the gas mixing device communicates with the reducing gas introduction hole through a pipe; the sealed box is provided therein with a weighing device; a dropping hole is provided on a lower end surface of the graphite crucible; the graphite crucible is placed directly above a graphite sleeve; the weighing device is located directly below the dropping hole.

During the working process, the sealing cover and the sealed box seal the high temperature furnace from the upper and lower ends to ensure that the entire measurement process is carried out normally. The opening on the upper end surface is used as an entrance for the graphite crucible at the beginning of the test. After the graphite crucible is placed, the sealing cover seals the opening of the upper end surface of the high temperature furnace. The reducing gas introduction hole on the side of the sealed box is used to input the reducing gas into the high temperature furnace. The sealed box is provided with a weighing device, which is placed directly under the dropping hole. During the test, a molten iron mixture formed by melting the iron ore specimen at a high temperature falls from the dropping hole onto the weighing device, and the weighing device obtains the weight change of the iron ore specimen in real time. The weight change is combined with the temperature of the high temperature furnace acquired by the temperature acquisition device to derive the change law between the weight of the iron ore specimen and the temperature of the high temperature furnace, so as to accurately grasp the change law of the weight of the iron ore specimen under the simulated conditions of the blast furnace.

Preferably, the measuring device further includes a computer system and a main control system; the temperature acquisition device is a thermocouple; the computer system is in data transmission connection with the thermocouple, the loading system, the gas supply system, the weighing device and the gas analyzer, respectively; the main control system controls the pressure applied by the loading system and the flow rate of each gas in the gas supply system according to the temperature data of the high temperature furnace transmitted by the thermocouple.

The present invention provides a computer system, which is in data transmission connection with the thermocouple, the loading system, the gas supply system, the weighing device and the gas analyzer. The temperature of the high temperature furnace acquired by the thermocouple, the pressure of the loading system applied on the iron ore specimen, the flow rate of each gas component in the gas supply system, the weight of the iron ore specimen recorded by the weighing device and the content of each gas in the waste gas collected by the gas analyzer are transmitted to the computer system in real time. The computer system displays and processes these data. The computer system calculates the direct reduction degree of the iron ore based on the data of the gas analyzer, and obtains the relationship between the weight of the iron ore specimen and the temperature of the high temperature furnace through the data transmitted by the thermocouple and the weighing device. The main control system controls the pressure applied by the loading system and the flow rate of each gas in the gas supply system according to the data transmitted by the thermocouple. Thus, the pressure applied by the loading system and the flow rate of each gas in the gas supply system change dynamically with the temperature of the high temperature furnace, which are closer to the actual working environment of the blast furnace.

A method for measuring the softening and melting performances of iron ore in blast furnace under a reducing condition, implemented by the above-mentioned device for measuring the softening and melting performances of iron ore, and including the following steps:

Step 1: placing dried coke and iron ore specimen in a graphite crucible according to a specified method.

Step 2: placing the graphite crucible in a high temperature furnace, and controlling a gas supply system to continuously feed $N_2$ into the high temperature furnace until a difference between a pressure in the high temperature furnace and a pressure outside the high temperature furnace is not less than $2*10^4$ Pa, so as to ensure optimal airtightness of the high temperature furnace.

Step 3: using a vacuum pump to extract a mixed gas in a hearth of the high temperature furnace, and starting to heat up when the pressure in the hearth of the high temperature furnace meets a preset experimental requirement.

Step 4: allowing a temperature acquisition device to acquire the temperature of the high temperature furnace in real time during the heating process.

A loading device drives a loading rod to move vertically according to the temperature of the high temperature furnace acquired by the temperature acquisition device based on a preset pressure control method, thereby controlling a pressure applied on iron ore specimen by a loading head.

When the temperature of the high temperature furnace is less than 500° C., the gas supply system continuously feeds $N_2$ into the high temperature furnace through a pipe. When the temperature of the high temperature furnace is not less than 500° C., the gas supply system feeds a reducing gas composed of $N_2$, $CO_2$, CO and $H_2$ into the high temperature furnace through a pipe. When the temperature of the high temperature furnace is greater than 500° C. but not greater than a final temperature (greater than 500° C.), a gas storage device controls a flow rate of each component in the reducing gas according to the temperature of the high temperature furnace acquired by the temperature acquisition device based on a preset flow control method. A gas mixing device fully mixes the components of the reducing gas and then inputs the reducing gas into the hearth through a pipe.

Step 5: acquiring data and calculating to complete the measurement of iron ore properties.

The measuring method of the present invention introduces a mixed reducing gas composed of $N_2$, $CO_2$, CO and $H_2$ into the high temperature furnace. Compared with the mixed gas of CO and $N_2$ used in the existing measuring method, the mixed gas of the present invention better simulates the actual working atmosphere of the blast furnace. During the test, the flow rate of each component in the reducing gas is controlled according to the change in the temperature of the high temperature furnace, so as to realize the dynamic control of the composition and flow rate of the reducing gas, making it closer to the actual working atmosphere of the blast furnace.

Throughout the test, the pressure applied to the iron ore specimen is controlled according to the temperature of the high temperature furnace. In this way, the pressure applied to the iron ore specimen is no longer a fixed value, but changes with the temperature, making it closer to the change in the pressure of the stock column to the iron ore in the blast furnace due to the varying position of the iron ore during actual smelting process.

Preferably, in step 4, when the temperature of the high temperature furnace acquired by the temperature acquisition device is 500° C. to 900° C., the gas storage device controls the flow rate of $CO_2$ from 1 L/min at 500° C. to linearly decrease with the increase of the furnace temperature to 0.75 L/min at 900° C., the flow rate of CO to linearly increase with the increase of the furnace temperature from 1.25 L/min at 500° C. to 1.5 L/min at 900° C., the flow rate of $H_2$ to be 0.25 L/min, and the flow rate of $N_2$ to be 2.5 L/min.

When the temperature of the high temperature furnace acquired by the temperature acquisition device is 900° C. to 1,100° C., the gas storage device controls the flow rate of $CO_2$ from 0.75 L/min at 900° C. to linearly decrease with the increase of the furnace temperature to 0.15 L/min at 1,100° C., the flow rate of CO to linearly increase with the increase of the furnace temperature from 1.5 L/min at 900° C. to 2.1 L/min at 1,100° C., the flow rate of $H_2$ to be 0.25 L/min, and the flow rate of $N_2$ to be 2.5 L/min.

When the temperature of the high temperature furnace acquired by the temperature acquisition device is 1,100° C. to 1,400° C., the gas storage device controls the flow rate of $CO_2$ from 0.15 L/min at 1,100° C. to linearly decrease with the increase of the furnace temperature to 0 L/min at 1,400° C., the flow rate of $H_2$ to linearly increase with the increase of the furnace temperature from 0.25 L/min at 1,100° C. to 0.4 L/min at 1,400° C., the flow rate of CO to be 2.1 L/min, and the flow rate of $N_2$ to be 2.5 L/min.

When the temperature of the high temperature furnace acquired by the temperature acquisition device is 1,400° C. to a final temperature, the gas storage device controls the flow rate of CO from 2.1 L/min at 1,400° C. to linearly decrease with the increase of the furnace temperature to 2 L/min at the final temperature, the flow rate of $H_2$ to linearly increase with the increase of the furnace temperature from 0.4 L/min at 1,400° C. to 0.5 L/min at the final temperature, the flow rate of $CO_2$ to be 0 L/min, and the flow rate of $N_2$ to be 2.5 L/min.

The final temperature is 1,600° C.

The present invention carries out staged flow control according to the temperature of the high temperature furnace. The flow rates of the components in the reducing gas vary (increase or decrease linearly) when the temperature of the high temperature furnace falls within different ranges. Thus, the reducing atmosphere in the high temperature furnace more accurately simulates the blast furnace atmosphere in the actual smelting process, so that the test results are closer to the actual operating conditions, improving the reference value of the test results.

Preferably, in step 4, the preset pressure control method is staged pressure control according to the temperature of the high temperature furnace.

When the temperature of the high temperature furnace acquired by the temperature acquisition device is room temperature to 200° C., the pressure applied by the loading head on the iron ore specimen is 0 kPa.

When the temperature of the high temperature furnace acquired by the temperature acquisition device is 200° C. to 900° C., the pressure applied by the loading head on the iron ore specimen increases from 0 kPa at a rate of 1.34 kPa/min.

When the temperature of the high temperature furnace acquired by the temperature acquisition device is 900° C. to 1,100° C., the pressure applied by the loading head on the iron ore specimen increases at a rate of 0.06 kPa/min.

When the temperature of the high temperature furnace acquired by the temperature acquisition device is 1,100° C. to a final temperature, the pressure applied by the loading head on the iron ore specimen remains unchanged.

The final temperature is 1,600° C.

The pressure applied on the iron ore specimen during the test is controlled in stages according to the temperature of the high temperature furnace, making it closer to the pressure in the actual smelting process.

Preferably, in step 4, the heating method is set as follows:

when the temperature of the high temperature furnace acquired by the temperature acquisition device is room temperature to 900° C., the heating rate of the high temperature furnace is 10° C./min;

when the temperature of the high temperature furnace acquired by the temperature acquisition device is 900° C. to 1,100° C., the heating rate of the high temperature furnace is 2° C./min;

when the temperature of the high temperature furnace acquired by the temperature acquisition device is 1,100° C. temperature to 1,400° C., the heating rate of the high temperature furnace is 3° C./min;

when the temperature of the high temperature furnace acquired by the temperature acquisition device is 1,400° C. to a final temperature, the heating rate of the high temperature furnace is 5° C./min;

after the test is completed, the gas supply system introduces $N_2$ into the hearth at a flow rate of 2 L/min; after the temperature of the high temperature furnace drops to 200° C., the gas input is stopped, and the high temperature furnace is air-cooled to room temperature;

the final temperature is 1,600° C.

In this way, the temperature change of the high temperature furnace is closer to that in the actual smelting process.

Preferably, in step 2, after the graphite crucible is placed in the high temperature furnace, $N_2$ is first fed into the high temperature furnace at a rate of 5 L/min until the difference between the pressure in the high temperature furnace and the pressure outside the high temperature furnace is not less than $2*10^4$ Pa, so as to ensure optimal airtightness of the high temperature furnace. In step 3, the high temperature furnace is vacuumed to make the vacuum degree in the high temperature furnace reach 8-12 Pa.

Reference Numerals: 1. displacement sensor; 2. vacuum compressor; 3. loading head; 4. gas storage device; 5. loading device; 6. loading rod; 7. lightweight refractory brick; 8. graphite crucible; 9. thermocouple; 10. graphite heating element; 11. graphite sleeve; 12. weighing device; 13. gas mixing device; 14. sealed box; 15. gas analyzer; 16. computer system; and 17. main control system.

DETAILED DESCRIPTION

The present invention is described in further detail below with reference to the accompanying drawings and examples.

As shown in FIGS. 1 to 4, a device for measuring the softening and melting performances of iron ore in blast furnace under a reducing condition includes a high temperature furnace, a gas supply system, a loading system and a weighing system.

Figure 1:
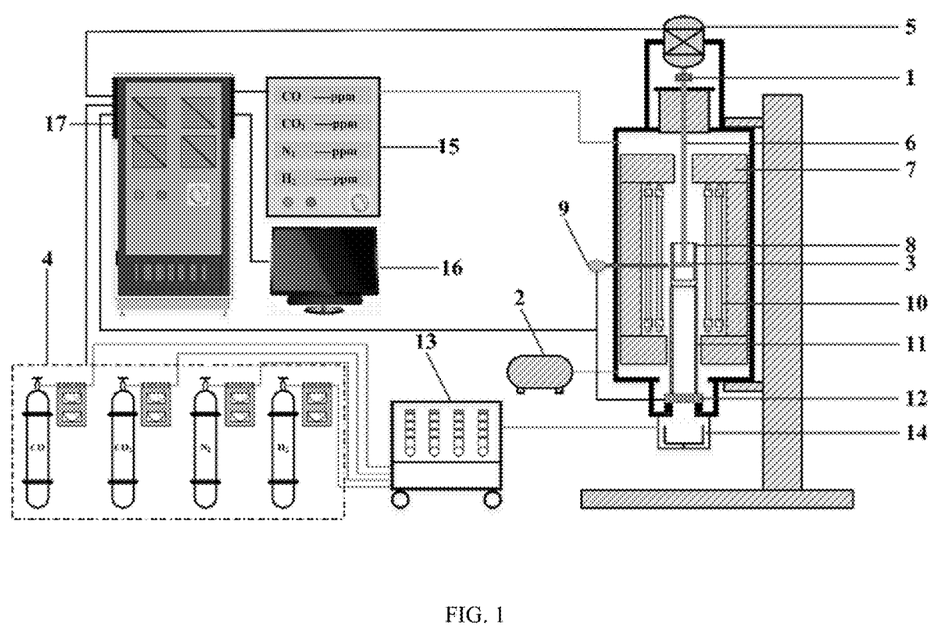
FIG. 1 is a structural diagram of a device for measuring the softening and melting performances of iron ore in blast furnace under a reducing condition according to a specific implementation of the present invention.
Figure 4:
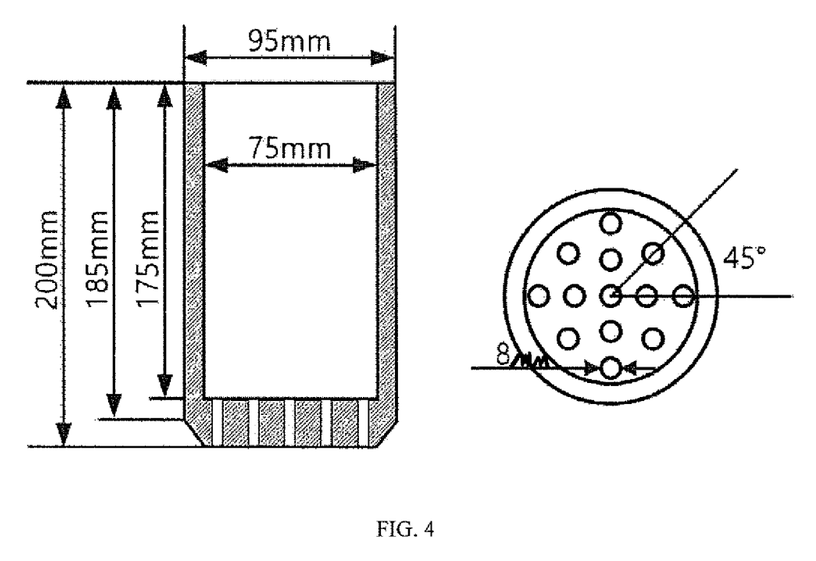
FIG. 4 is a structural diagram of a graphite crucible in a device for measuring the softening and melting performances of iron ore in blast furnace under a reducing condition according to a specific implementation of the present invention.

The high temperature furnace is provided therein with a hearth; the hearth is provided therein with a cylindrical graphite crucible 8 with an open upper end and a dropping hole on a lower end surface; the hearth is further provided therein with a temperature acquisition device for acquiring temperature data of the high temperature furnace.

The gas supply system is used to inject a reducing gas including $N_2$, $H_2$, $CO_2$ and CO into the hearth; the gas supply system includes a gas storage device 4 and a gas mixing device 13 communicating with the gas storage device 4 through a pipe; the gas storage device 4 is used to store the components of the reducing gas separately and control flow rates of the components of the reducing gas according to the temperature of the high temperature furnace acquired by the temperature acquisition device; the gas mixing device 13 is used to fully mix the components of the reducing gas and communicate with the hearth of the high temperature furnace through a pipe.

The loading system includes a loading rod 6; a lower end of the loading rod 6 extends into the graphite crucible 8, and an upper end of the loading rod 6 extends out of the high temperature furnace; a portion of the upper end of the loading rod 6 extending out of the high temperature furnace is fixedly connected with a loading device 5 and a displacement sensor 1 from bottom to top; the loading device 5 drives the loading rod 6 to move vertically according to the temperature of the high temperature furnace acquired by the temperature acquisition device; a lower end surface of the loading rod 6 is provided with a loading head 3 for applying a pressure to iron ore specimen in the graphite crucible 8; the loading head 3 vertically moves in the graphite crucible 8 to change the pressure applied to the iron ore specimen when the loading rod 6 moves vertically.

The weighing system includes an electronic balance, a controller and a weight sensor; the electronic balance is placed in a sealing box at a lower part of the high temperature furnace to send a weight change to an external computer via the weight sensor; the controller is used to calibrate the electronic balance.

In this way, when the measuring device of the present invention is used to measure the softening and melting performances of the iron ore specimen, the iron ore specimen is placed in the graphite crucible 8, and the temperature acquisition device measures the temperature of the high temperature furnace in real time.

During the measurement process, the gas supply system inputs the reducing gas including $N_2$, $H_2$, $CO_2$ and CO into the high temperature furnace. The flow rate of each component in the reducing gas is dynamically controlled by the gas storage device 4 according to the temperature of the high temperature furnace acquired by the temperature acquisition device. The components of the reducing gas are fully mixed in the gas mixing device 13 and input into the high temperature furnace. The content of the components in the reducing gas in the high temperature furnace changes dynamically with the temperature of the high temperature furnace. In this way, the present invention achieves dynamic control of the composition and flow rate of the reducing gas, making it closer to the actual working atmosphere of the blast furnace.

The loading device 5 drives the loading rod 6 to move vertically according to the temperature of the high temperature furnace acquired by the temperature acquisition device, and the loading rod 6 drives the loading head 3 to move vertically in the graphite crucible 8 while moving vertically. Thus, the pressure applied by the loading head 3 to the iron ore specimen changes dynamically with the temperature of the furnace, which is closer to the change in the pressure of the stock column to the iron ore in the high temperature furnace due to the varying position of the iron ore during actual smelting process.

Beneficial effects: The present invention inputs a mixed reducing gas composed of $N_2$, $CO_2$, CO and $H_2$ into the high temperature furnace, and dynamically adjusts the composition and flow rate of the reducing gas according to the temperature of the high temperature furnace. Thus, the high temperature furnace of the measuring device is closer to the actual smelting environment. In addition, the present invention dynamically adjusts the pressure applied by the loading head 3 on the iron ore specimen according to the temperature of the high temperature furnace, so as to better simulate the change in the pressure of the stock column to the iron ore in the high temperature furnace due to the varying position of the iron ore during actual smelting process. Therefore, the measuring device of the present invention better simulates the actual working atmosphere of the iron-making blast furnace and dynamically adjusts the load on the iron ore specimen, so that the test results are closer to the actual operation of the iron-making blast furnace.

In this example, the gas storage device 4 includes an $N_2$ supply device, a $H_2$ supply device, a $CO_2$ supply device and a CO supply device; the $N_2$ supply device includes a $N_2$ cylinder for storing $N_2$ and a $N_2$ flow control valve for controlling a flow rate of $N_2$; the $H_2$ supply device includes a $H_2$ cylinder for storing $H_2$ and a $H_2$ flow control valve for controlling a flow rate of $H_2$; the $CO_2$ supply device includes a $CO_2$ cylinder for storing $CO_2$ and a $CO_2$ flow control valve for controlling a flow rate of $CO_2$; the CO supply device includes a CO cylinder for storing CO and a CO flow control valve for controlling a flow rate of CO.

In this way, the components of the reducing gas are stored separately, and their flow rates are controlled by the respective flow control valve, which achieves better control of the flow rates of the components in the whole measurement process.

In this example, the measuring device further includes a waste gas detection device; the waste gas detection device includes a gas analyzer 15; the gas analyzer 15 is connected to the gas outlet through a pipe; the gas outlet is provided at an upper end of the high temperature furnace; the gas analyzer 15 is used to measure the content of $N_2$, $H_2$, $CO_2$ and CO in the gas discharged from the gas outlet in real time, and calculate a direct reduction degree of the iron ore based on carbon-oxygen balance.

In this way, the gas analyzer 15 measures the content of each component discharged from the gas outlet in real time, and easily calculates the direct reduction degree of the iron ore based on carbon-oxygen balance.

In this example, an upper end surface and a lower end surface of the high temperature furnace are provided with openings communicating with the hearth; the opening of the upper end surface of the high temperature furnace is provided with a sealing cover in sealed connection with the upper end surface of the high temperature furnace; the opening of the lower end surface of the high temperature furnace is provided with a cylindrical sealed box 14 open on an upper end and communicating with the hearth; the upper end opening of the sealed box 14 has an area larger than that of the lower end opening of the high temperature furnace; the sealed box 14 is provided with a reducing gas introduction hole on a side; the gas mixing device 13 communicates with the reducing gas introduction hole through a pipe; the sealed box 14 is provided therein with a weighing device 12; a dropping hole is provided on a lower end surface of the graphite crucible; the graphite crucible is placed directly above a graphite sleeve; the weighing device 12 is located directly below the dropping hole.

During the working process, the sealing cover and the sealed box 14 seal the high temperature furnace from the upper and lower ends to ensure that the entire measurement process is carried out normally. The opening on the upper end surface is used as an entrance for the graphite crucible 8 at the beginning of the test. After the graphite crucible 8 is placed, the sealing cover seals the opening of the upper end surface of the high temperature furnace. The reducing gas introduction hole on the side of the sealed box 14 is used to input the reducing gas into the high temperature furnace. The sealed box 14 is provided with a weighing device 12, which is placed directly under the dropping hole. During the test, the iron ore specimen melt at a high temperature falls from the dropping hole onto the weighing device 12, and the weighing device 12 obtains the weight change of the iron ore specimen in real time. The weight change is combined with the temperature of the high temperature furnace acquired by the temperature acquisition device to derive the change law between the weight of the iron ore specimen and the temperature of the high temperature furnace, so as to accurately grasp the change law of the weight of the iron ore specimen under the simulated conditions of the blast furnace.

In this example, the measuring device further includes a computer system 16 and a main control system 17; the temperature acquisition device is a thermocouple 9; the computer system 16 is in data transmission connection with the thermocouple 9, the loading system, the gas supply system, the weighing device 12 and the gas analyzer 15, respectively; the main control system 17 controls the pressure applied by the loading system and the flow rate of each gas in the gas supply system according to the temperature data of the high temperature furnace transmitted by the thermocouple 9.

This example provides a computer system 16, which is in data transmission connection with the thermocouple 9, the loading system, the gas supply system, the weighing device 12 and the gas analyzer 15. The temperature of the high temperature furnace acquired by the thermocouple 9, the pressure of the loading system applied on the iron ore specimen, the flow rate of each gas component in the gas supply system, the weight of the iron ore specimen recorded by the weighing device 12 and the content of each gas in the waste gas collected by the gas analyzer 15 are transmitted to the computer system 16 in real time. The computer system 16 displays and processes these data. The computer system 16 calculates the direct reduction degree of the iron ore based on the data of the gas analyzer 15, and obtains the relationship between the weight of the iron ore specimen and the temperature of the high temperature furnace through the data transmitted by the thermocouple 9 and the weighing device 12. The main control system 17 controls the pressure applied by the loading system and flow rate of each gas in the gas supply system according to the data transmitted by the thermocouple 9. Thus, the pressure applied by the loading system and the flow rate of each gas in the gas supply system changes dynamically with the temperature of the high temperature furnace, making them closer to the actual working environment of the blast furnace.

In this example, the high temperature furnace includes a furnace shell, a lightweight refractory brick 7, a graphite heating element 10 and a graphite tube in sequence from the outside to the inside; the graphite crucible 8 is placed in the graphite tube; a copper cooling water pipe is filled between the furnace shell and the lightweight refractory brick 7, which accelerates the temperature drop in the high temperature furnace and prolongs the service life of the high temperature furnace.

In this example, the measuring device further includes a vacuum compressor 2; the vacuum compressor 2 communicates with the gas outlet for vacuuming the high temperature furnace at the beginning of the test.

In this example, a graphite sleeve 11 is provided on a lower end of the graphite crucible 8; the lower end of the graphite crucible 8 is placed on the graphite sleeve 11 for limiting the position of the graphite crucible 8 and supporting the graphite crucible 8.

A method for measuring the softening and melting performances of iron ore in blast furnace under a reducing condition, implemented by the above-mentioned device for measuring the softening and melting performances of iron ore, and including the following steps:

Step 1: place dried coke and iron ore specimen in a graphite crucible 8 according to a specified method.

Step 2: place the graphite crucible 8 in the high temperature furnace, and control a gas supply system to continuously feed $N_2$ into the high temperature furnace until the difference between the pressure in the high temperature furnace and the pressure outside the high temperature furnace is not less than $2*10^4$ Pa, so as to ensure optimal airtightness of the high temperature furnace.

Step 3: use a vacuum pump to extract a mixed gas in a hearth of the high temperature furnace, and start to heat up when the pressure in the hearth of the high temperature furnace meets a preset experimental requirement, that is, a vacuum degree in the high temperature furnace reaches 8-12 Pa.

Step 4: allow a temperature acquisition device to acquire the temperature of the high temperature furnace in real time during the heating process.

The loading device drives the loading rod 6 to move vertically according to the temperature of the high temperature furnace acquired by the temperature acquisition device based on a preset pressure control method, thereby controlling a pressure applied on iron ore specimen by a loading head 3.

When the temperature of the high temperature furnace is less than 500° C., the gas supply system continuously feeds $N_2$ into the high temperature furnace through a pipe. When the temperature of the high temperature furnace is not less than 500° C., the gas supply system feeds a reducing gas composed of $N_2$, $CO_2$, CO and $H_2$ into the high temperature furnace through a pipe. When the temperature of the high temperature furnace is not greater than a final temperature, a gas storage device 4 controls a flow rate of each component in the reducing gas according to the temperature of the high temperature furnace acquired by the temperature acquisition device based on a preset flow control method. A gas mixing device 13 fully mixes the components of the reducing gas and then inputs the reducing gas into the hearth through a pipe.

Step 5: acquire data and calculate to complete the measurement of iron ore properties.

The measuring method of the present invention introduces a mixed reducing gas composed of $N_2$, $CO_2$, CO and $H_2$ into the high temperature furnace. Compared with the mixed gas of CO and $N_2$ used in the existing measuring method, the mixed gas of the present invention better simulates the actual working atmosphere of the blast furnace. During the test, the flow rate of each component in the reducing gas is controlled according to the change in the temperature of the high temperature furnace, so as to realize the dynamic control of the composition and flow rate of the reducing gas, making it closer to the actual working atmosphere of the blast furnace.

Throughout the test, the pressure applied to the iron ore specimen is controlled according to the temperature of the high temperature furnace. In this way, the pressure applied to the iron ore specimen is no longer a fixed value, but changes with the temperature, making it closer to the change in the pressure of the stock column to the iron ore in the blast furnace due to the varying position of the iron ore during actual smelting process.

In this example, in step 4, when the temperature of the high temperature furnace acquired by the temperature acquisition device is 500° C. to 900° C., the gas storage device controls the flow rate of $CO_2$ from 1 L/min at 500° C. to linearly decrease with the increase of the furnace temperature to 0.75 L/min at 900° C., the flow rate of CO to linearly increase with the increase of the furnace temperature from 1.25 L/min at 500° C. to 1.5 L/min at 900° C., the flow rate of $H_2$ to be 0.25 L/min, and the flow rate of $N_2$ to be 2.5 L/min.

When the temperature of the high temperature furnace acquired by the temperature acquisition device is 900° C. to 1,100° C., the gas storage device 4 controls the flow rate of $CO_2$ from 0.75 L/min at 900° C. to linearly decrease with the increase of the furnace temperature to 0.15 L/min at 1,100° C., the flow rate of CO to linearly increase with the increase of the furnace temperature from 1.5 L/min at 900° C. to 2.1 L/min at 1,100° C., the flow rate of $H_2$ to be 0.25 L/min, and the flow rate of $N_2$ to be 2.5 L/min.

When the temperature of the high temperature furnace acquired by the temperature acquisition device is 1,100° C. to 1,400° C., the gas storage device 4 controls the flow rate of $CO_2$ from 0.15 L/min at 1,100° C. to linearly decrease with the increase of the furnace temperature to 0 L/min at 1,400° C., the flow rate of $H_2$ to linearly increase with the increase of the furnace temperature from 0.25 L/min at 1,100° C. to 0.4 L/min at 1,400° C., the flow rate of CO to be 2.1 L/min, and the flow rate of $N_2$ to be 2.5 L/min.

When the temperature of the high temperature furnace acquired by the temperature acquisition device is 1,400° C. to a final temperature, the gas storage device 4 controls the flow rate of CO from 2.1 L/min at 1,400° C. to linearly decrease with the increase of the furnace temperature to 2 L/min at the final temperature, the flow rate of $H_2$ to linearly increase with the increase of the furnace temperature from 0.4 L/min at 1,400° C. to 0.5 L/min at the final temperature, the flow rate of $CO_2$ to be 0 L/min, and the flow rate of $N_2$ to be 2.5 L/min;

The final temperature is 1,600° C.

Figure 5:
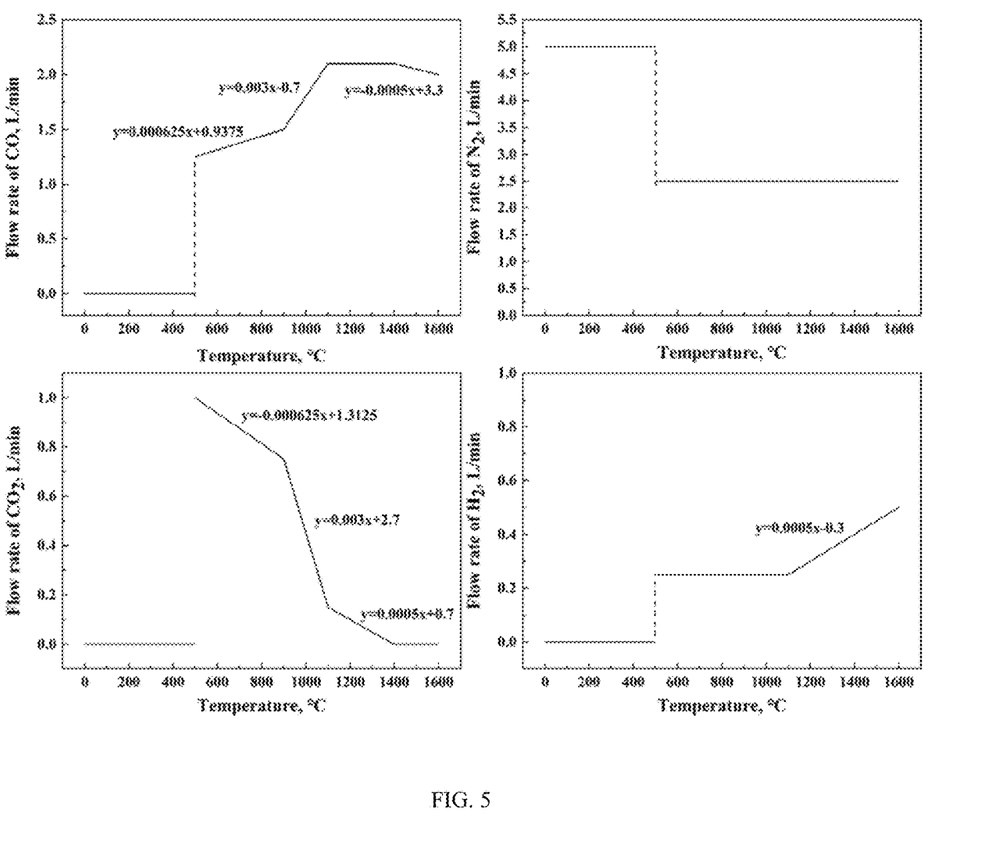
FIG. 5 shows a control curve of a reducing gas flow rate of a device for measuring reduction-induced softening, dropping properties of iron ore in blast furnace according to a specific implementation of the present invention.

Specifically, the relationship between the flow rates of the components in the reducing gas and the furnace temperature is shown in Table 1 and FIG. 5.

TABLE 1

Relationship between flow rates of reducing gas components and furnace temperatures

| Temperature of blast furnace | Flow rate of $N_2$ (L/min) | Flow rate of $CO_2$ (L/min) | Flow rate of CO (L/min) | Flow rate of $H_2$ (L/min) |
|---|---|---|---|---|
| Room temperature-500° C. | 5 | 0 | 0 | 0 |
| 500-900° C. | 2.5 | 1-0.75 | 1.25-1.5 | 0.25 |
| 900-1100° C. | 2.5 | 0.75-0.15 | 1.5-2.1 | 0.25 |
| 1100-1400° C. | 2.5 | 0.15-0 | 2.1 | 0.25-0.4 |
| 1400-1600° C. | 2.5 | 0 | 2.1-2 | 0.4-0.5 |

This example carries out staged flow control according to the temperature of the high temperature furnace. The flow rates of the components in the reducing gas vary when the temperature of the high temperature furnace falls within different ranges. Thus, the reducing atmosphere in the high temperature furnace more accurately simulates the blast furnace atmosphere in the actual smelting process, so that the test results are closer to the actual operating conditions, improving the reference value of the test results.

In this example, in step 4, the preset pressure control method is staged pressure control according to the temperature of the high temperature furnace.

When the temperature of the high temperature furnace acquired by the temperature acquisition device is room temperature to 200° C., the pressure applied by the loading head 3 on the iron ore specimen is 0 kPa.

When the temperature of the high temperature furnace acquired by the temperature acquisition device is 200° C. to 900° C., the pressure applied by the loading head 3 on the iron ore specimen increases from 0 kPa at a rate of 1.34 kPa/min.

When the temperature of the high temperature furnace acquired by the temperature acquisition device is 900° C. to 1,100° C., the pressure applied by the loading head 3 on the iron ore specimen increases at a rate of 0.06 kPa/min.

Figure 2:
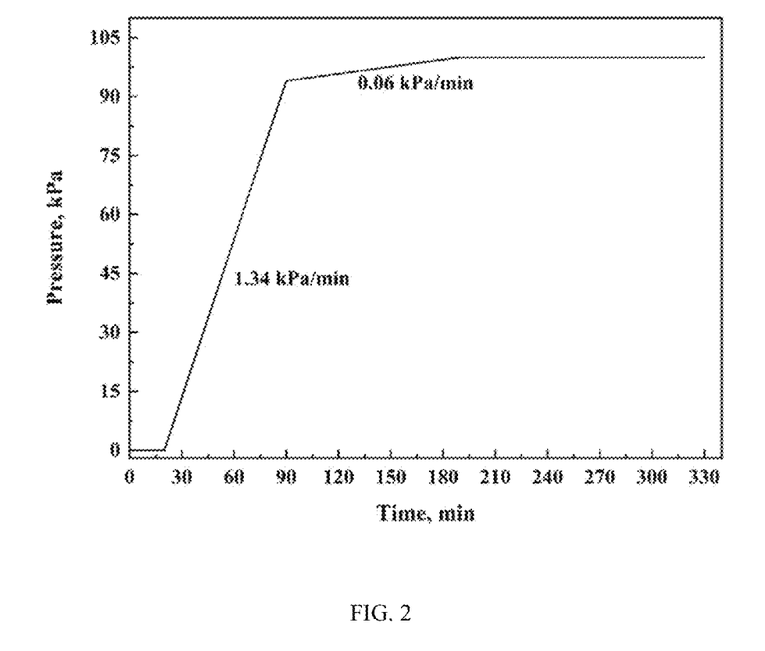
FIG. 2 shows a blast pressure control curve of a method for measuring the softening and melting performances of iron ore in blast furnace under a reducing condition according to a specific implementation of the present invention.

When the temperature of the high temperature furnace acquired by the temperature acquisition device is 1,100° C. to a final temperature, the pressure applied by the loading head 3 on the iron ore specimen remains unchanged, as shown in FIG. 2.

The final temperature is 1,600° C.

The pressure applied on the iron ore specimen during the test is controlled in stages according to the temperature of the high temperature furnace, making it closer to the pressure in the actual smelting process.

Figure 3:
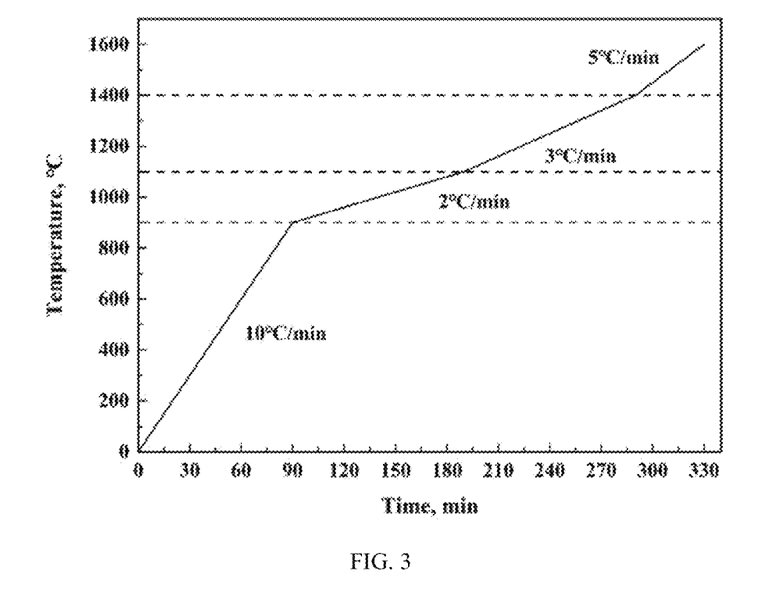
FIG. 3 shows a control curve of a heating program of a method for measuring the softening and melting performances of iron ore in blast furnace under a reducing condition according to a specific implementation of the present invention.

In this example, in step 4, the heating method is set as follows:

when the temperature of the high temperature furnace acquired by the temperature acquisition device is room temperature to 900° C., the heating rate of the high temperature furnace is 10° C./min;

when the temperature of the high temperature furnace acquired by the temperature acquisition device is 900° C. to 1,100° C., the heating rate of the high temperature furnace is 2° C./min;

when the temperature of the high temperature furnace acquired by the temperature acquisition device is 1,100° C. temperature to 1,400° C., the heating rate of the high temperature furnace is 3° C./min;

when the temperature of the high temperature furnace acquired by the temperature acquisition device is 1,400° C. to a final temperature, the heating rate of the high temperature furnace is 5° C./min, as shown in FIG. 3;

after the test is completed, the gas supply system introduces $N_2$ at a flow rate of 2 L/min; after the temperature drops to 200° C., the gas input is stopped, and the high temperature furnace is air-cooled to room temperature;

the final temperature is 1,600° C.

In this way, the temperature change of the high temperature furnace is closer to that in the actual smelting process.

In this example, in step 2, after the graphite crucible 8 is placed in the high temperature furnace, the gas supply system first feeds $N_2$ into the high temperature furnace at a rate of 5 L/min until the difference between the pressure in the high temperature furnace and the pressure outside the high temperature furnace is not less than $2*10^4$ Pa, so as to ensure optimal airtightness of the high temperature furnace.

In step 3, the preset experimental requirement is a vacuum degree of 8-12 Pa in the high temperature furnace, which is achieved by vacuuming the high temperature furnace.

The air tightness of the system is checked to ensure the tightness of the working environment of the high temperature furnace throughout the test.

In this example, in step 4, after the test is completed, $N_2$ is introduced into the high temperature furnace at a rate of 2 L/min; when the temperature of the high temperature furnace is less than 200° C., the introduction of $N_2$ is stopped.

In this example, in step 1, 1,000 g±0.5 g of dried iron ore specimen and 320 g±0.5 g of coke are taken, the particle size of the iron ore specimen ranging from 10 mm to 12.5 mm; the specified method includes: place 80 g of the dried coke flat on the bottom of the graphite crucible, apply a pressure of 196 kPa±1 kPa on the surface of the coke, and record a height $H_1$ of the feedstock in the graphite crucible; then spread 500 g±0.5 g of the dried iron ore specimen on the surface of the coke, apply a pressure of 196 kPa±1 kPa to the surface of the iron ore specimen, and record a height $H_2$ of the feedstock in the graphite crucible; and finally spread 80 g of the dried coke on the surface of the iron ore specimen, and flatten the surface of the coke.

In step 4, during the heating process of the high temperature furnace, the displacement sensor 1 is used to acquire the height of the iron ore specimen at each temperature in real time, and the weighing device 12 is used to acquire the weight of the iron ore specimen at each temperature in real time.

The initial height of the iron ore specimen is H (H=$H_2$-$H_1$), and the height and weight of the iron ore specimen acquired at each temperature are used for the calculation of relevant parameters in step 4.

In this example, in step 5, the characteristic parameters of the softening and melting performances of the iron ore include specimen shrinkage rate, softening start temperature, softening final temperature, pressure difference, melting start temperature, dropping temperature, softening interval, softening-melting interval, melting-dropping interval and iron ore weight loss rate. The specimen shrinkage rate is the ratio of the change height of the specimen during the test to the original specimen height. The softening start temperature is the temperature at which the specimen shrinks by 10%, and the softening final temperature is the temperature at which the specimen shrinks by 40%. The melting start temperature is the temperature corresponding to a turning point where the pressure difference rises sharply. The dropping temperature is the temperature at which a first droplet of molten iron drops. The softening interval is the difference between the softening final temperature and the softening start temperature. The softening-melting interval is the difference between the dropping temperature and the melting start temperature. The melting-dropping interval is the difference between the dropping temperature and the softening start temperature. The iron ore weight loss rate is the ratio of the weight loss of the iron ore to the initial weight.

Specifically, these parameters are calculated as follows:
1) Shrinkage rate of iron ore specimen $$\Delta t = \frac{H_{600} - H_t}{H}$$

$$H = H_2 - H_1$$

Where,
$\Delta t$ is the shrinkage rate of the iron ore specimen at the furnace temperature of t° C., %;
$H_{600}$ is the height of the iron ore specimen at the furnace temperature of 600° C., mm;
$H_t$ is the height of the iron ore specimen at the temperature of t° C., mm;
H is the initial height of the iron ore specimen, mm.

2) Softening interval, softening-melting interval, melting-dropping interval and softening-melting-dropping zone $$\Delta T_1 = T_{40} - T_{10}$$

$$\Delta T_2 = T_d - T_s$$

$$\Delta T_3 = T_d - T_{10}$$

$$\Delta H = H_s - T_d$$

Where,
$\Delta T_1$ is the softening interval, ° C.;
$\Delta T_2$ is the softening-melting interval, ° C.;
$\Delta T_3$ is the melting-dropping interval, ° C.;
$\Delta H$ is the thickness of the softening-melting-dropping zone, mm;
$T_{10}$ is a temperature at which the shrinkage rate of the iron ore specimen is 10%, ° C.;
$T_{40}$ is a temperature at which the shrinkage rate of the iron ore specimen is 40%, ° C.;
$T_s$ is a temperature at which the iron ore specimen starts to melt, ° C.;
$T_d$ is a temperature at which the iron ore specimen starts to drop, ° C.;
$H_s$ is the height of the iron ore specimen at which the iron ore specimen starts to melt, mm.
$H_d$ is the height of the iron ore specimen at which the iron ore specimen starts to drop, mm.

3) Weight loss rate of iron ore specimen $$\Delta m = \frac{m_0 - m_t}{m_0}$$

Where,
$\Delta m$ is the weight loss rate of the iron ore specimen;
$m_0$ is the initial weight of the iron ore specimen, g;
$m_t$ is the weight of the iron ore specimen at t, g.

In this way, the property parameters of the iron ore specimen are obtained through calculation, which provide a basis for the property analysis of the iron ore specimen.

It should be noted that the above examples are only intended to explain, rather than to limit the technical solutions of the present invention. Those of ordinary skill in the art should understand that modifications or equivalent substitutions may be made to the technical solutions of the present invention without departing from the spirit and scope of the technical solutions of the present invention, and such modifications or equivalent substitutions should be included within the scope of the claims of the present invention.

What is claimed is:

1. A method for measuring the softening and melting performances of iron ore in blast furnace under reducing condition, implemented by a device for measuring the softening and melting performances of iron ore in blast furnace under a reducing condition which device comprises a high temperature furnace, a gas supply system, a loading system and a weighing system, wherein the high temperature furnace is provided therein with a hearth; the hearth is provided therein with a cylindrical graphite crucible with an open upper end and a temperature acquisition device for acquiring temperature data of the high temperature furnace; a temperature of the high temperature furnace ranges from a room temperature to 1600° C.;

the gas supply system is used to feed a reducing gas comprising $N_2$, $H_2$, $CO_2$ and CO into the hearth; the gas supply system comprises a gas storage device and a gas mixing device communicating with the gas storage device through a pipe; the gas storage device is used to store components of the reducing gas separately and control flow rates of the components of the reducing gas according to the temperature of the high temperature furnace acquired by the temperature acquisition device; the gas mixing device is used to fully mix the components of the reducing gas and communicate with the hearth of the high temperature furnace through a pipe;

the loading system comprises a loading rod, and an upper end of the loading rod extends out of the high temperature furnace; a portion of the upper end of the loading rod extending out of the high temperature furnace is fixedly connected with a loading device and a displacement sensor from bottom to top; the loading device drives the loading rod to move vertically according to the temperature of the high temperature furnace acquired by the temperature acquisition device; a lower end surface of the loading rod is provided with a loading head for applying a pressure to an iron ore specimen in the graphite crucible; the loading head vertically moves in the graphite crucible to change the pressure applied to the iron ore specimen when the loading rod moves vertically;

the weighing system comprises an electronic balance, a controller and a weight sensor; the electronic balance is placed in a sealed box at a lower part of the high temperature furnace to send a weight change to an external computer via the weight sensor; the controller is used to calibrate the electronic balance; and the method comprising the following steps:

step 1: placing dried coke and the iron ore specimen in the graphite crucible according to a specified method, wherein the specified method includes: placing 80 g of the dried coke flat on a bottom of the graphite crucible, applying a pressure of 196 kPa±1 kPa on a surface of the dried coke, and recording a height $H_1$ of feedstock in the graphite crucible; then spreading 500 g±0.5 g of the iron ore specimen on the surface of the coke, applying a pressure of 196 kPa±1 kPa to a surface of the iron ore specimen, and recording a height $H_2$ of the feedstock in the graphite crucible; spreading 80 g of the dried coke on the surface of the iron ore specimen, and flattening the surface of the coke;

step 2: placing the graphite crucible in the high temperature furnace, and controlling the gas supply system to continuously feed $N_2$ into the high temperature furnace until a difference between a pressure in the high temperature furnace and a pressure outside the high temperature furnace is not less than $2*10^4$ Pa;

step 3: using a vacuum pump to extract a mixed gas in the hearth of the high temperature furnace, and starting to heat up when the pressure in the hearth of the high temperature furnace-meets a preset experimental requirement which is a vacuum degree of 8-12 Pa;

step 4: allowing the temperature acquisition device to acquire the temperature of the high temperature furnace in real time during a heating process;

wherein, the loading device drives the loading rod to move vertically according to the temperature of the high temperature furnace acquired by the temperature acquisition device based on a pressure control method, thereby controlling a pressure applied on the iron ore specimen by the loading head; wherein, the pressure control method is staged pressure control according to the temperature of the high temperature furnace:

when the temperature of the high temperature furnace acquired by the temperature acquisition device is room temperature to 200° C., the pressure applied by the loading head on the iron ore specimen is 0 kPa;

when the temperature of the high temperature furnace acquired by the temperature acquisition device is 200° C. to 900° C., the pressure applied by the loading head on the iron ore specimen increases from 0 kPa at a rate of 1.34 kPa/min;

when the temperature of the high temperature furnace acquired by the temperature acquisition device is 900° C. to 1,100° C., the pressure applied by the loading head on the iron ore specimen increases at a rate of 0.06 kPa/min;

when the temperature of the high temperature furnace acquired by the temperature acquisition device is 1,100° C. to a final temperature, the pressure applied by the loading head on the iron ore specimen remains unchanged; wherein the final temperature is 1,600° C.;

when the temperature of the high temperature furnace is less than 500° C., the gas supply system continuously feeds $N_2$ into the high temperature furnace through a pipe; when the temperature of the high temperature furnace is not less than 500° C., the gas supply system feeds the reducing gas composed of $N_2$, $CO_2$, CO and $H_2$ into the high temperature furnace through a pipe; when the temperature of the high temperature furnace is greater than 500° C. but not greater than a final temperature greater than 500° C., the gas storage device controls a flow rate of each component in the reducing gas according to the temperature of the high temperature furnace acquired by the temperature acquisition device based on a flow control method; the gas mixing device fully mixes the components of the reducing gas and then inputs the reducing gas into the hearth through a pipe; wherein, the flow control method is staged flow control according to the temperature of the high temperature furnace:

when the temperature of the high temperature furnace acquired by the temperature acquisition device is 500° C. to 900° C., the gas storage device controls the flow rate of $CO_2$ from 1 L/min at 500° C. to linearly decrease with the increase of the furnace temperature to 0.75 L/min at 900° C., the flow rate of CO to linearly increase with the increase of the furnace temperature from 1.25 L/min at 500° C. to 1.5 L/min at 900° C., the flow rate of $H_2$ to be 0.25 L/min, and the flow rate of $N_2$ to be 2.5 L/min;

when the temperature of the high temperature furnace acquired by the temperature acquisition device is 900° C. to 1,100° C., the gas storage device controls the flow rate of $CO_2$ from 0.75 L/min at 900° C. to linearly decrease with the increase of the furnace temperature to 0.15 L/min at 1,100° C., the flow rate of CO to linearly increase with the increase of the furnace temperature from 1.5 L/min at 900° C. to 2.1 L/min at 1,100° C., the flow rate of $H_2$ to be 0.25 L/min, and the flow rate of $N_2$ to be 2.5 L/min;

when the temperature of the high temperature furnace acquired by the temperature acquisition device is 1,100° C. to 1,400° C., the gas storage device controls the flow rate of $CO_2$ from 0.15 L/min at 1,100° C. to linearly decrease with the increase of the furnace temperature to 0 L/min at 1,400° C., the flow rate of $H_2$ to linearly increase with the increase of the furnace temperature from 0.25 L/min at 1,100° C. to 0.4 L/min at 1,400° C., the flow rate of CO to be 2.1 L/min, and the flow rate of $N_2$ to be 2.5 L/min;

when the temperature of the high temperature furnace acquired by the temperature acquisition device is 1,400° C. to a final temperature, the gas storage device controls the flow rate of CO from 2.1 L/min at 1,400° C. to linearly decrease with the increase of the furnace temperature to 2 L/min at the final temperature, the flow rate of $H_2$ to linearly increase with the increase of the furnace temperature from 0.4 L/min at 1,400° C. to 0.5 L/min at the final temperature, the flow rate of $CO_2$ to be 0 L/min, and the flow rate of $N_2$ to be 2.5 L/min; wherein the final temperature is 1,600° C.; and step 5: acquiring data and calculating to complete the measurement of iron ore properties.

2. The method for measuring the softening and melting performances of iron ore in blast furnace under a reducing condition according to claim 1, wherein in step 4, the heating process is set as follows:

when the temperature of the high temperature furnace acquired by the temperature acquisition device is room temperature to 900° C., the heating rate of the high temperature furnace is 10° C./min;

when the temperature of the high temperature furnace acquired by the temperature acquisition device is 900° C. to 1,100° C., the heating rate of the high temperature furnace is 2° C./min;

when the temperature of the high temperature furnace acquired by the temperature acquisition device is 1,100° C. temperature to 1,400° C., the heating rate of the high temperature furnace is 3° C./min;

when the temperature of the high temperature furnace acquired by the temperature acquisition device is 1,400° C. to a final temperature, the heating rate of the high temperature furnace is 5° C./min;

after the test is completed, the gas supply system introduces $N_2$ into the hearth at a flow rate of 2 L/min; after the temperature of the high temperature furnace drops to 200° C., the gas input is stopped, and the high temperature furnace is air-cooled to room temperature; wherein the final temperature is 1,600° C.

3. The method for measuring the softening and melting performances of iron ore in blast furnace under a reducing condition according to claim 1, wherein in step 2, after the graphite crucible is placed in the high temperature furnace, the gas supply system first feeds $N_2$ into the high temperature furnace at a rate of 5 L/min.

* * * * *